US007395208B2

(12) United States Patent
Chrysanthakopoulos et al.

(10) Patent No.: US 7,395,208 B2
(45) Date of Patent: Jul. 1, 2008

(54) INTEGRATING EXTERNAL VOICES

(75) Inventors: Georgios Chrysanthakopoulos, Redmond, WA (US); Brian L. Schmidt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 918 days.

(21) Appl. No.: 10/260,184

(22) Filed: Sep. 27, 2002

(65) Prior Publication Data

US 2004/0064320 A1 Apr. 1, 2004

(51) Int. Cl.
*G01L 11/00* (2006.01)
*G01L 21/00* (2006.01)
(52) U.S. Cl. .................. 704/278; 704/270; 704/275; 704/500
(58) Field of Classification Search .......... 704/270, 704/348, 711
See application file for complete search history.

(56) References Cited

U.S. PATENT DOCUMENTS

| 4,121,058 | A | * | 10/1978 | Jusko et al. ............... 704/201 |
|---|---|---|---|---|
| 4,330,689 | A | * | 5/1982 | Kang et al. ............... 704/219 |
| 4,354,263 | A | * | 10/1982 | Bordry et al. ............. 370/389 |
| 4,480,271 | A | * | 10/1984 | Coleman, Jr. ............. 386/33 |
| 4,577,314 | A | * | 3/1986 | Chu et al. ................ 370/420 |
| 4,618,936 | A | * | 10/1986 | Shiono .................... 704/267 |
| 4,631,746 | A | * | 12/1986 | Bergeron et al. ........... 704/217 |
| 4,769,723 | A | * | 9/1988 | Tran ....................... 360/39 |
| 5,067,016 | A | * | 11/1991 | Wang ...................... 348/448 |
| 5,155,743 | A | * | 10/1992 | Jacobs .................... 375/247 |
| 5,157,728 | A | * | 10/1992 | Schorman et al. ......... 704/502 |
| 5,301,190 | A | * | 4/1994 | Tsukuda et al. ........... 370/362 |
| 5,341,365 | A | * | 8/1994 | Clarke .................... 370/508 |
| 5,408,266 | A | * | 4/1995 | Ikeyama et al. .......... 348/222.1 |
| 5,424,850 | A | * | 6/1995 | Inoue et al. .............. 386/100 |
| 5,600,582 | A | * | 2/1997 | Miyaguchi ............... 708/300 |
| 5,636,209 | A | * | 6/1997 | Perlman ................. 370/281 |
| 5,812,968 | A | * | 9/1998 | Hassan et al. ............. 704/221 |

(Continued)

FOREIGN PATENT DOCUMENTS

WO WO 99/35009 7/1999

OTHER PUBLICATIONS

Bell, Eric W. 2001. "Creawiare Audio Powersampler 2.03 (Mac/Win)." *Electronic Musician* 17:3 (March). 6pp. Available http://asp.nerac.com/caccess/WNDABSM?SESSION=D77697D3003C6332&ndn=102024322373&topic.

(Continued)

*Primary Examiner*—Eric Yen (57) ABSTRACT

Integrating voice communication into a game console to minimize or eliminate voice data processing by a primary processor. Input voice data from a microphone or a network is processed by a secondary processor and stored in a circular buffer. Drift between storing and reading the processed voice data may result from differing data rates, interrupts, and other latencies. If the circular buffer, accumulates an amount of data that exceeds a predefined threshold corresponding to a human perceptible latency, a pointer in the circular buffer is reset, so that only a portion of the processed voice data is output. A stream of packet contexts each indicate a location and length of voice data in the circular buffer to be output. Preferably, the output voice data is encoded in a standard digital format, such as universal serial bus. The output voice data may be communicated to a network or a sound transducer.

20 Claims, 7 Drawing Sheets

U.S. PATENT DOCUMENTS

| | | | | |
|---|---|---|---|---|
| 5,818,948 | A | | 10/1998 | Gulick .......................... 381/77 |
| 5,824,936 | A | * | 10/1998 | DuPuis et al. .................. 84/663 |
| 5,959,689 | A | * | 9/1999 | De Lange et al. ............ 348/571 |
| 6,241,612 | B1 | * | 6/2001 | Heredia ........................ 463/42 |
| 6,351,730 | B2 | * | 2/2002 | Chen ........................... 704/229 |
| 6,404,872 | B1 | * | 6/2002 | Goldberg et al. ........ 379/201.11 |
| 6,987,514 | B1 | * | 1/2006 | Beresin et al. ............... 345/473 |
| 2003/0014246 | A1 | * | 1/2003 | Choi ........................... 704/207 |
| 2003/0046498 | A1 | * | 3/2003 | Roever ........................ 711/154 |

OTHER PUBLICATIONS

Davis, A.W. 1994. "DSP's, multimedia, & videoconferencing." *Abstract from SciTech Journal* 4:4 (Jul.-Aug.). 1pg. Available http://asp.nerac.com/caccess/WNDABSM?SESSION=D77697D3003C6332&ndn=083047604009&topic.

Donlan, Paul. 2000. "DirectPlay Voice: A Discussion of Implementation Design Strategies and Costs." (February). 6pp. Available http://msdn.microsoft.com/library/en-us/dnplay/html/dplayvoice.asp?frame=true.

Shilling, Russell and Eric Krebs. 2002. "Videogame and Entertainment Industry Standard Sound Design Techniques and Architectures for Use in Videogames, Virtual Environments and Training Systems." 9pp. Available http://www.movieinstitute.org-/conferencepapers/.

"Revel in the Unprecedented Gaming Power of Audigy™ Advanced HD™." 2001. 2pp. Available www.creative.com.

"Game Device Links." n.d. 3pp. Available http://www.gameclubcentral.com/About/links.asp.

"Game Voice" with "Feature Overview" & "Technology Overview." 2000. 15pp. Available http://zone.msn.com/allegiance/news/gamevoice.asp.

"IDirectPlayVoiceClient." 2002. 3pp. Available http://msdn.microsoft.com/library/en-us/dx8_c/directx_cpp/Play/CPP_Ref/Ifaces/IDirectPlayVoiceClient/....

"Roger Wilco! Frequently Asked Questions." n.d. 3pp. Available http://rogerwilco.gamespy.com/products/rw/faq.html.

"TeamSound Voice! Battlefield sequencing gets your team working together!" n.d. 2pp. Available http://www.teamsound.com/overview.shtml.

"Experience the thrill of home-theater, multi-channel sound on you PC." 2001. 2pp. Available www.turtle-beach.com.

* cited by examiner

INTEGRATING EXTERNAL VOICES

FIELD OF THE INVENTION

The present invention generally relates to audio processing of multiple audio data streams on a computing device, so that minimal processing of the data streams is required of a general processor in the computing device; and more specifically, pertains to voice capture and playback of a plurality of voice streams on a game console, where the voice streams are conveyed locally and/or over a network, using an auxiliary processor to carry out a substantial portion of the processing of the voice data.

BACKGROUND OF THE INVENTION

Voice communication for gaming and other electronic activities is becoming increasingly popular, particularly for individuals connected over the Internet or other network. For those participating in multiplayer games, voice communication greatly expands the depth of enjoyment and social interaction between players of a game. Most computing devices include audio circuitry such as sound cards or audio processing modules so that they are able to produce audible sounds and handle voice communications, as well as performing other processing required when executing applications such as game software. Often, a general central processing unit (CPU) in prior art computing devices, including conventional game consoles, must carry out a substantial portion of the processing required for implementing voice communications between individuals. For example, personal computers (PCs) enable voice-over-Internet protocol (VoIP) communication over a network using software such as Microsoft Corporation's GAME VOICE™, MSN MESSENGER™, and NET-MEETING™. Whether for communication over a network or use within one machine, voice processing is typically controlled by the CPU in the PC executing a voice function software module, such as a specific application programming interface (API). For instance Microsoft Corporation's DIRECTPLAY™ Voice API captures one or more voices, encodes the voice data, and sends the voice data to an output. Unfortunately, voice communication and other audio data processing are computationally intensive. Using the primary processor of the computing device to perform voice communication may substantially burden the primary processor, and reduce its efficiency for performing other tasks, which can be particularly troublesome when executing game software applications, since the quality of play can be adversely impacted if the primary processor is not able to maintain the flow of the game in real time.

To help alleviate the burden on the CPU, many computing devices also include a coprocessor, a digital signal processor (DSP), or other secondary processor on a separate plug-in card or directly on the main circuit board. For example, PCs typically include a sound card for assisting in the processing of music, voice communications, and other audio data associated with music composition and playback, games, dictation, teleconferencing, and other activities. With regard to voice communications, a microphone is usually connected to the sound card for analog voice input. The analog voice input is converted to digital voice data with an analog to digital (A/D) converter, and a processor on the sound card routes the digital voice data to the CPU. Voice data received over a network connection is already in digital form and is routed directly to the CPU. In any case, the CPU determines whether to store the digital voice data in permanent storage, convert the data to some other form, packetize the data for transmission over the network, recognize a command, play the data through a speaker or headphone, or perform some other function determined by a related program executed by the CPU. To accomplish its function, the CPU coordinates with the device that is required for the function. For example, the CPU may instruct a processor on the sound card to pass the data through a digital to analog converter (D/A) and out to one or more speakers, or may instruct a network interface device to transmit the digital voice data over a network.

These input and output processes require some coordination between the processors involved. The primary CPU often runs at a different clock rate than the processor on the sound card, and at a different rate than communication interfaces. Thus, the data may be buffered by the faster running processor until the slower processor can process the data. The buffering and changes in processing speed introduce latency between the input and output of the voice communication. A drifting latency may also be introduced if differing clock rates are not easily synchronized, such as by a simple multiplier. Thus, additional time cushions and control schemes may be built into the coordination process to accommodate the drift in processing that arises between multiple processors in a machine. To provide high quality, real-time voice communication, it is desirable to minimize the amount of coordination required between processors and to minimize any latency between the input and output of the voice communication.

Increases in processor capabilities and speeds have helped to reduce latency in processing audio data by different processors. However, improvement in the speed of hardware has not made the latency and coordination overhead negligible or undetectable to users. And, multimedia applications on low cost and limited capability hardware, such as game consoles, will often not include such higher cost processors. A game console typically includes a primary CPU that is relatively slower that the CPU employed on a PC, because of the need to maintain a relatively low cost for the game console. If voice communication were the only task required when executing a complex application program, such as a game, then the full capabilities of a primary CPU could readily be utilized. However in most circumstances, voice communication is just one of many functions that must be performed.

When multiple, computationally-intensive functions must be performed with limited capability processor hardware, each function must be prioritized to serve the greatest needs of the user. Typically, graphics and other primary tasks of an application program are considered to have a high priority, and these tasks consume a large amount of processor resources. Thus, sound processing and voice communication often receive a lower priority than the other tasks. Nevertheless, high quality sound is increasingly important to make a user's experience more realistic. In addition, voice processing is becoming more important to enhance the user's interaction with others. Therefore, it is desirable to reserve the CPU for executing high priority functions, yet provide voice communication with minimal latency and low overhead on a device with limited processing capabilities, such as a game console. It is further desirable to maintain a relatively low cost game console or other computing device by employing processors having somewhat limited capability, employ a minimal number of A/D and D/A converters, and use digital interfaces, such as the universal serial bus (USB), the Institute of Electrical and Electronics Engineers (IEEE) 1394 (e.g., FIREWIRE™) interface, or other such data communication interfaces.

SUMMARY OF THE INVENTION

The present invention provides a method and system for integrating voice communication into a game console that includes a primary processor and a secondary processor, yet minimizes use of the primary processor for processing voice data. The game console receives voice data as an input from a local microphone or from network communication. Preferably, the voice data bypasses the primary processor and is routed directly to the secondary processor. The secondary processor may apply audio functions and/or audio effects to the voice data such as mixing, sample rate conversion, filtering, reverberation, distortion, and other standard or custom functions and/or effects. The processed voice data is stored in a memory, and the memory location is specified in a packet context. The packet context also identifies a length of the stored processed voice data that an output controller is to output to an audio transducer or to a network.

In one aspect of the invention the input voice data is supplied as pulse code modulation (PCM) data at a first data rate, and processed by the secondary processor that runs at a second data rate. The secondary processor converts the processed voice data back to the first data rate, and stores the converted voice data in a circular buffer of the memory. The converted voice data stored in the circular buffer is evaluated to determine whether an amount of the converted voice data is greater than a predefined limit. The predefined limit preferably corresponds to a human perceptible latency. If the predefined limit is exceeded, a read location in the circular buffer is advanced so that a portion of the converted voice data stored in the memory is not used in producing a stream of packets of the voice data to be output from the game console. The read location is preferably advanced an amount that avoids creating the human perceptible latency in the stream of packets of the voice data that is to be output from the game console. The primary processor accesses the converted voice data stored in the circular buffer according to the read location to produce a stream of packets of the converted voice data for output from the game console. Preferably, the primary processor encodes each read location and length of converted voice data in the packet contexts so that the output controller can access the circular buffer according to the packet contexts and output the converted voice data. The converted voice data may be encoded as USB data, Internet protocol (IP) data, infrared data, data conforming to IEEE 1394 standards, or other digital data before being output from the game console. The converted voice data may then be conveyed over a network or converted to an analog signal for driving a sound transducer.

Another aspect of the invention is directed toward additional details regarding storing and accessing the converted voice data in the circular buffer. In particular, at each write operation, the secondary processor updates a current write offset that indicates a location in the circular buffer at which the converted voice data will next be stored. Also determined is an old write offset that corresponds to a location in the circular buffer at which a first portion of the converted voice data was previously stored. If the current write offset differs from the old write offset by more than a predefined amount, the old write offset is reset to correspond to a location in the circular buffer that is within the predefined amount.

A further aspect of the invention is a memory medium having machine instructions stored thereon for carrying Out steps according to the invention. Other aspects of the invention will become clearer in light of the discussion below.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

A preferred embodiment of the present invention is described below in regard to an exemplary use in providing audio for an electronic gaming system that is designed to execute gaming software distributed on a portable, removable medium. Those skilled in the art will recognize that the present invention may also be implemented in conjunction with a set-top box, an arcade game, a hand-held device, an attached high fidelity system or associated computer speaker system, and other related systems. It should also be apparent that the present invention may be practiced on a single machine, such as a PC, or in a network environment, with multiple consoles or interconnected computing devices that may be connected with one or more server computers.

Exemplary Operating Environment

Figure 1:
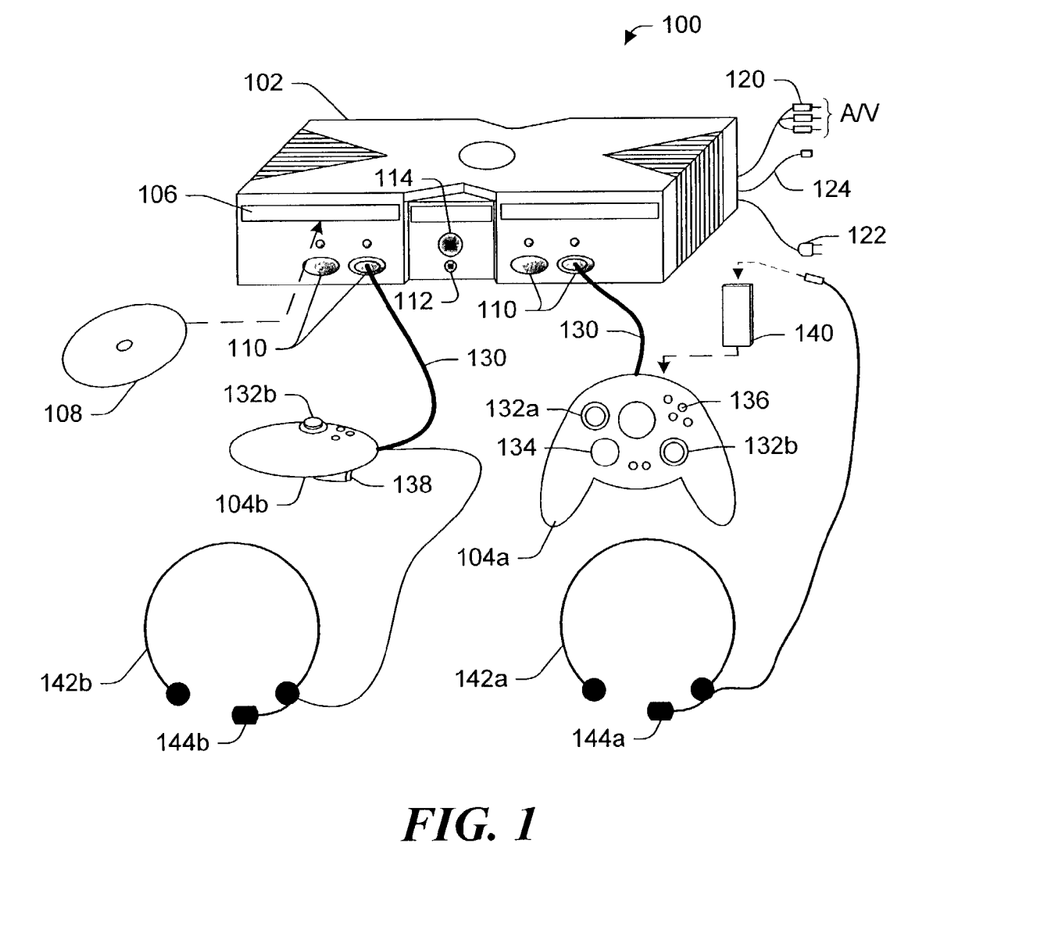
FIG. 1 illustrates an exemplary electronic gaming system that includes a game console and support for up to four user input devices.

As shown in FIG. 1, an exemplary electronic gaming system 100 that is suitable for practicing the present invention includes a game console 102 and support for up to four user input devices, such as controllers 104a and 104b. Game console 102 is equipped with an internal hard disk drive (not shown in this Figure) and a portable media drive 106 that supports various forms of portable optical storage media, as represented by an optical storage disc 108. Examples of suitable portable storage media include DVD discs and CD-ROM discs. In this gaming system, game programs are preferably distributed for use with the game console on DVD discs, but it is also contemplated that other storage media might instead be used on this or other types of systems that employ the present invention.

On a front face of game console 102 are four slots 110 for connection to supported controllers, although the number and arrangement of the slots may be modified. A power button 112, anid an eject button 114 are also positioned on the front face of game console 102. Power button 112 controls application of electrical power to the game console, and eject button 114 alternately opens and closes a tray (not shown) of portable media drive 106 to enable insertion and extraction of storage disc 108, so that the digital data on it can be read for use by the game console.

Game console 102 connects to a television or other display monitor or screen (not shown) via audio/visual (A/V) interface cables 120. A power cable plug 122 conveys electrical power to the game console when connected to a conventional alternating current line source (not shown). Game console 102 includes an Ethernet data connector 124 to transfer and receive data over a network (such as through a connection to a hub or a switch (not shown), or over the Internet, for example, through a connection to an xDSL interface, a cable modem, or other broadband interface (not shown). Other types of game consoles that implement the present invention may be coupled together or to a remote server, by communicating using a conventional telephone modem.

Each controller 104a and 104b is coupled to game console 102 via a lead (or alternatively through a wireless interface). In the illustrated implementation, the controllers are USB compatible and are connected to game console 102 via USB cables 130; however, it is contemplated that other types of data interfaces may instead be employed. Game console 102 may be equipped with any of a wide variety of user devices for interacting with and controlling the game software. As illustrated in FIG. 1, each controller 104a and 104b is equipped with two thumbsticks 132a and 132b, a D-pad 134, buttons 136, and two triggers 138. These controllers are merely representative, and other gaming unput and control devices may be substituted for or added to those shown in FIG. 1 for use with game console 102.

A removable function unit 140 can optionally be inserted into each controller 104a and 104b to provide additional features and functions. For example, a portable memory unit (MU) enables users to store game parameters and port them for play on other game consoles, by inserting the portable MU into a controller connected to the other game console. Another removable functional unit comprises a voice communication unit that enables a user to verbally communicate with other users locally and/or over a network. Connected to the voice communication unit is a headset 142a, which includes a boom microphone 144a. The circuitry of the voice communication unit may alternatively be integrated into the controller and a headset 142b with boom microphone 144b, may be removably or permanently connected to the controller. Preferably, each controller is configured to accommodate two removable function units, although more or fewer than two removable function units or modules may instead be employed.

Gaming system 100 is capable of playing, for example, games, music, and videos. It is contemplated that other functions can be implemented using digital data stored on the hard disk drive or read from optical storage disc 108 in drive 106, or using digital data obtained from an online source, or from a MU. For example, gaming system 100 is potentially capable of playing:

Game titles stored on CD and DVD discs, on the hard disk drive, or downloaded from an online source;

Digital music stored on a CD in portable media drive 106, in a file on the hard disk drive (e.g., WINDOWS MEDIA AUDIO™ (WMA) format), or derived from online streaming sources on the Internet or other network; and Digital A/V data stored on a DVD disc in portable media drive 106, or in a file on the hard disk drive (e.g., in an Active Streaming Format), or from online streaming sources 1on the Internet or other network.

Figure 2:
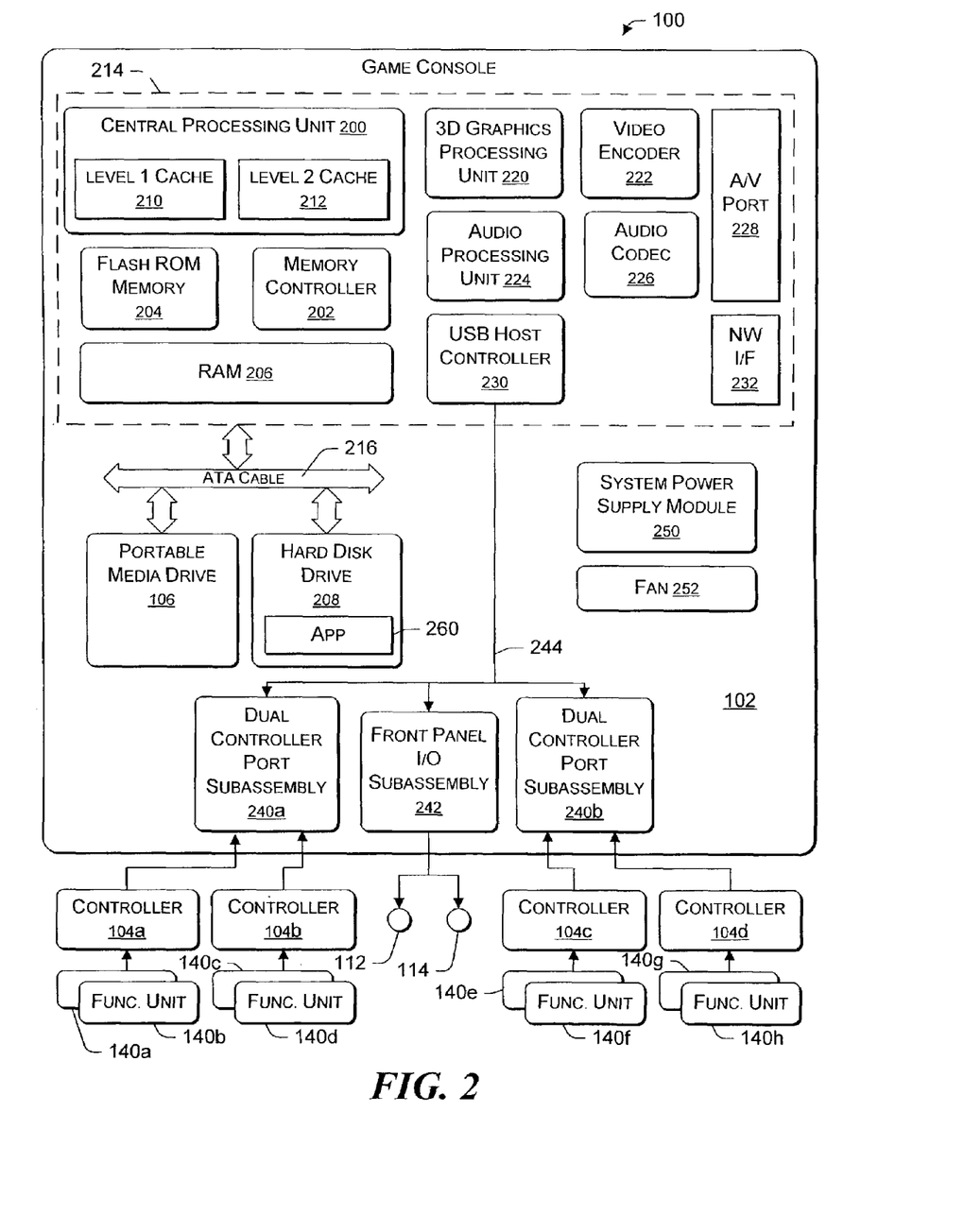
FIG. 2 is a functional block diagram showing components of the gaming system of FIG. 1 in greater detail.

FIG. 2 shows functional components of gaming system 100 in greater detail. Game console 102 includes a CPU 200, and a memory controller 202 that facilitate processor access to a read-only memory (ROM) 204, a random access memory (RAM) 206, a hard disk drive 208, and portable media drive 106. CPU 200 is equipped with a level 1 cache 210 and a level 2 cache 212 to temporarily store data so as to reduce the number of memory access cycles required, thereby improving processing speed and throughput. CPU 200, memory controller 202, and various memory devices are interconnected via one or more buses, including serial anid parallel buses, a memory bus, a peripheral bus, and a processor or local bus using ally of a variety of bus architectures. By way of example, such architectures can include an Industry Standard Architecture (ISA) bus, a micro channel architecture (MCA) bus, an enhanced ISA (EISA) bus, a Video Electronics Standards Association (VESA) local bus, and a peripheral component interconnect (PCI) bus.

As an example of one suitable implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple double data rate synchronous dynamic RAM modules (DDR SDRAM modules) that are independently controlled by memory controller 202 via separate buses (not shown). Hard disk drive 208 and portable media drive 06 are connected to the memory controller via the PCI bus and an advanced technology attachment (ATA) bus 216.

A 3D graphics processing unit (GPU) 220 and a video encoder 222 form a video processing pipeline for high-speed and high-resolution graphics processing. Data are carried from GPU 220 to video encoder 222 via a digital video bus (not shown). An audio processing unit 224 and an audio encoder/decoder (CODEC) 226 form a corresponding audio processing pipeline for high fidelity and stereo audio data processing. Audio data are carried between audio processing unit 224 and audio CODEC 226 via a communication link (not shown). The video and audio processing pipelines output data to an A/V port 228 for transmission to the television or other display monitor. In the illustrated implementation, video and audio processing components 220-228 are mounted on module 214.

Also implemented on module 214 are a USB host controller 230 anid a network interface 232. USB host controller 230 is coupled to CPU 200 and memory controller 202 via a bus (e.g., the PCI bus), and serves as a host for peripheral controllers 104a-104d. Network interface 232 provides access to a network (e.g., the Internet, home network, etc.) and may be any of a wide variety of various wire or wireless inter-face components, including an Ethernet card, a telephone modem interface, a Bluetooth module, a cable modem interface, an xDSL interface, and the like.

Game console 102 has two dual controller Support subassemblies 240a and 240b, and each subassembly supports two of game controllers 104a-104d. A front panel input/output (I/O) subassembly 242 supports the functionality of power button 112 and eject button 114, as well as any light-emitting diodes (LEDs) or other indicators exposed on the outer surface of the game console. Subassemblies 240a, 240b, and 242 are coupled to module 214 via one or more cable assemblies 244.

Eight function units 140a-140h are illustrated as being connectable to four controllers 104a-104d, i.e., two function units for each controller. Each function unit 140 offers additional functionality or storage for games, game parameters, and other data. When an MU is inserted into a controller, the MU can be accessed by memory controller 202.

A system power supply module 250 provides power to the components of gaming system 100. A fan 252 cools the components and circuitry within game console 102.

To implement the present invention, a game software application 260 comprising machine instructions stored on a DVD or other storage media (or downloaded over the network) is loaded into RAM 206 and/or caches 210 and/or 212 for execution by CPU 200. Portions of software application 260 may be loaded into RAM only when needed, or all of the software application (depending on its size) may be loaded into RAM 206. Software application 260 and the relevant functions that it performs to implement the present invention are described below in greater detail.

Gaming system 100 may be operated as a stand-alone system by simply connecting the system to a television or other display monitor. In this standalone mode, gaming system 100 enables one or more users to play games, watch movies, or listen to music. However, with connectivity to the Internet or other network, which is made available through network interface 232, gaming system 100 may be further operated as a component of a larger network gaming community, to enable online multiplayer interaction in games that are played over the Internet or other network with players Using other gaming systems. Gaming system 100 can also be coupled in peer-to-peer communication with another gaming system using the network interface and appropriate cable.

Network System

Figure 3:
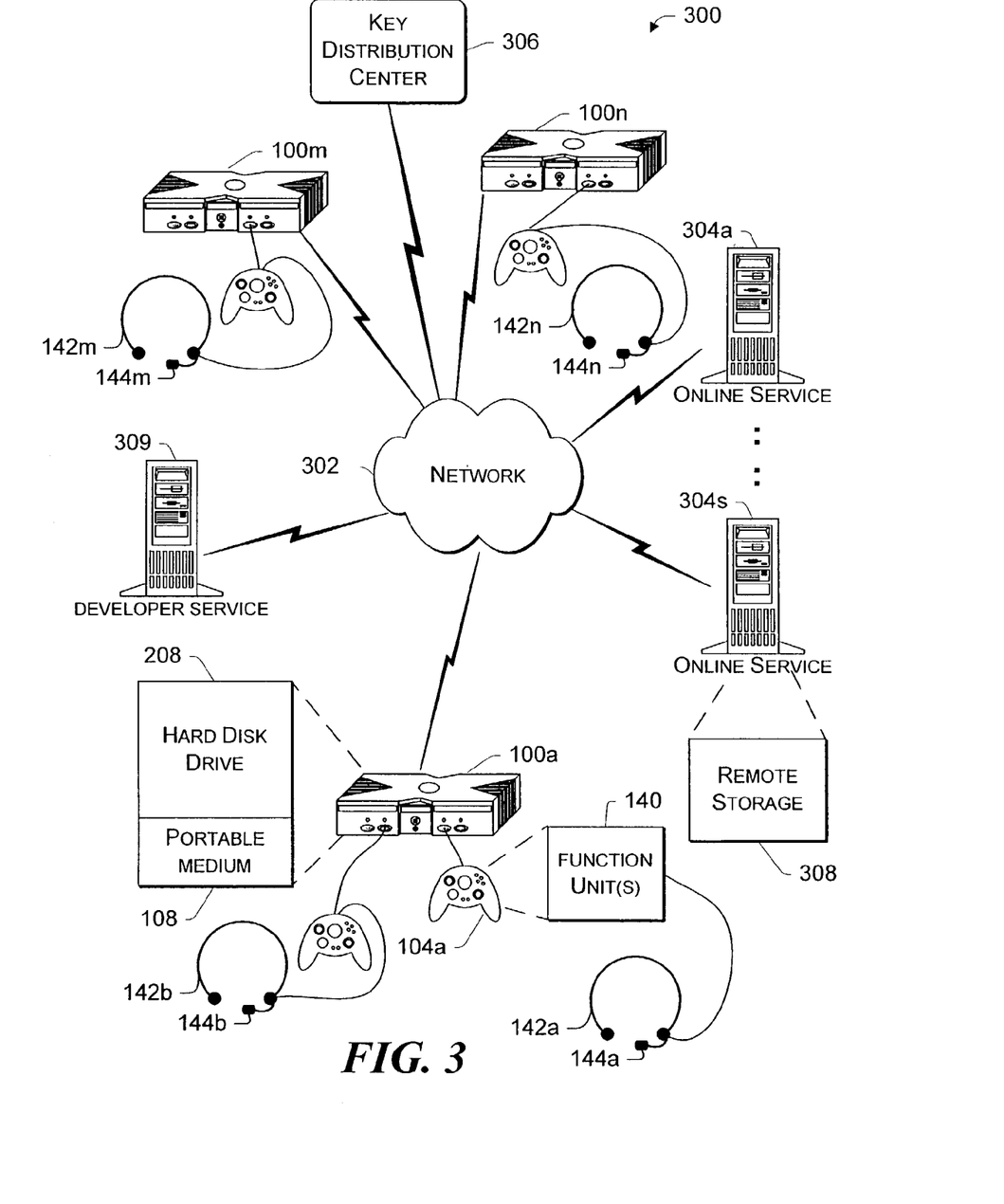
FIG. 3 shows an exemplary network gaming environment that interconnects multiple gaming systems like that of FIGS. 1 and 2 via a network.

FIG. 3 shows an exemplary network gaming environment 300 that interconnects multiple gaming systems 100a, ... 100n via a network 302. Preferably, each gaming system includes at least one corresponding headset 142a, ... 142n and corresponding microphone 144a, ... 144n for voice communication between players. Network 302 represents any of a wide variety of data communication networks and may include public portions (e.g., the Internet), as well as private portions (e.g., a residential or commercial local area network (LAN)). Network 302 may be implemented Using any one or more of a wide variety of conventional communication configurations, including both wired and wireless types. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304a, ... 304s are accessible via network 302 to provide various services for the participants, such as serving and/or hosting online games, serving downloadable music or video files, hosting gaming competitions, serving streaming A/V files, enabling exchange of email or other media communications, and the like. Network gaming environment 300 may further employ a key distribution center 306 that plays a role in authenticating individual players and/or gaming systems 100 for interconnection to one another, as well as to online services 304a, ... 304s. Distribution center 306 distributes keys and service tickets to valid participants that may then be used to form game playing groups including multiple players, or to purchase services from online services 304a, ... 304s.

Network gaming environment 300 introduces another memory source avail able to individual gaming systems 100, i.e., online storage. In addition to accessing data on optical storage disc 108, hard disk drive 208, and function unit 140, gaming system 100a can also access data files available at remote storage locations via network 302, as exemplified by remote storage 308 at online service 304s.

Network gaming environment 300 further includes a developer service 309 with which developers can produce media effects, updated media data, game code, and other services. Such services call be distributed between the online services and the producers of games for the gaming systems, and between other devices within, and outside of network gaming environment 300.

Exemplary Process

A preferred embodiment of the present invention is directed to relieving a game console's primary processor from voice communication processing by integrating voice capture and playback into the audio processing system of the game console. Voice communication is routed to the audio processing system, which treats streaming voice data similar to a stored sound file. Incoming voice data from one or more sources can optionally be mixed, enhanced, and routed to the headset of each player on the game console or to speakers attached to the game console. Similarly, outgoing voice data from a player using the game console can selectively be mixed with outgoing voice data from another player using the same game console and routed to the headset of each player on the game console, to speakers, and/or over a network to one or more players using other game consoles.

Figure 4:
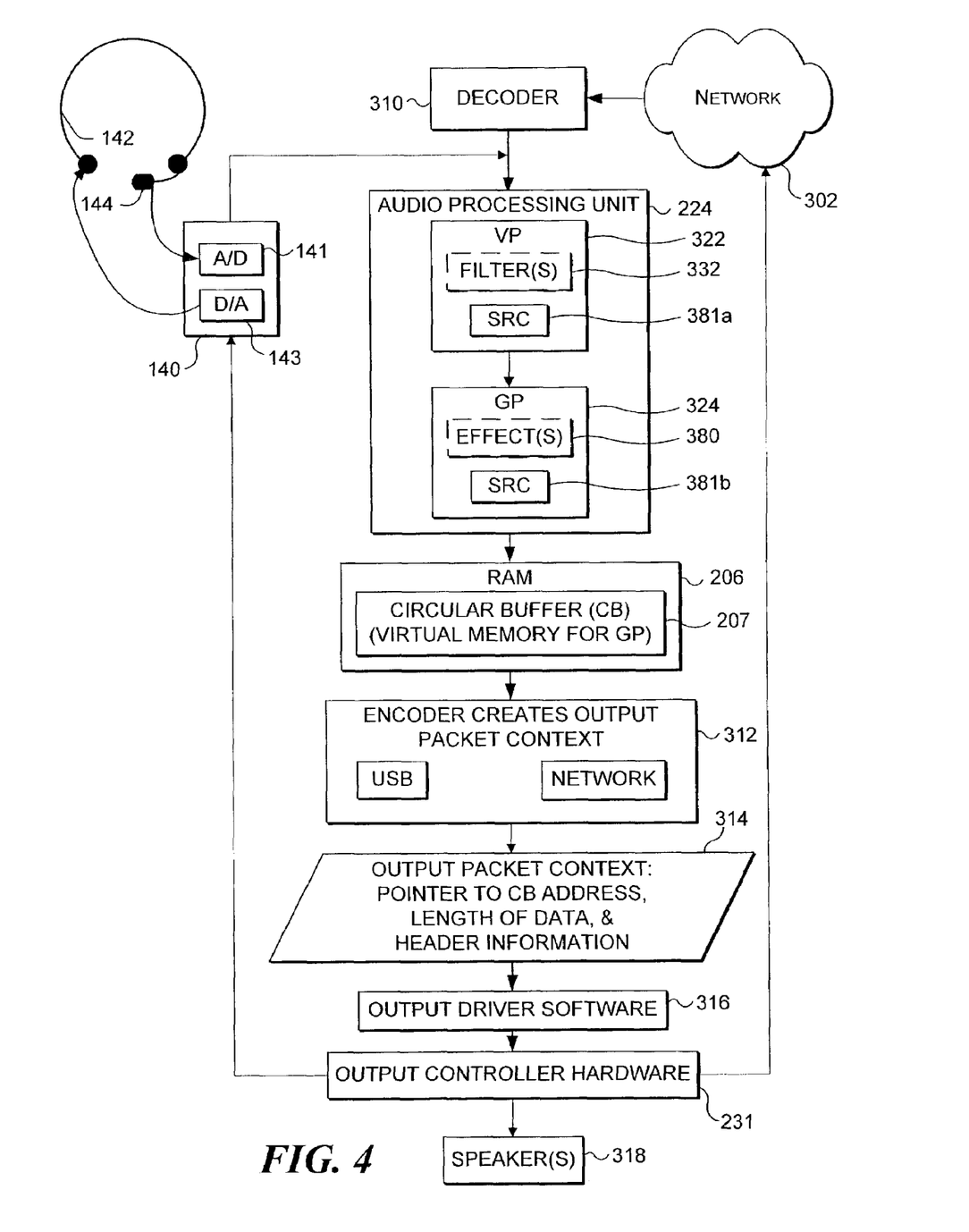
FIG. 4 is a functional block diagram illustrating a process for integrating voice communication into the audio processing system of the game console.

FIG. 4 is a functional block diagram illustrating a process for integrating voice communication into the audio processing system of the game console. Voice communication may originate from boom microphone 144 of headset 142 connected to the local game console, or from at remote game console and conveyed via network 302. As described above, boom microphone 144 communicates with the game console via a connection to removable function unit 140, which is referred to as a voice communicator module. Preferably, removable function unit 140 includes an A/D converter 141 to convert analogue voice signals to a digital signal, producing corresponding PCM digital data at about 8 kHz. The PCM data are routed to audio processing unit 224. Alternatively, encoded voice data may be received by decoder 310 over network 302. Decoder 310 converts encoded voice data received over the network into PCM data that are input to audio processing unit 224. With reference to FIG. 2, decoder 310 may be audio CODEC 226, CPU 200, or another processor such as a DSP.

Audio processing unit 224 processes the voice PCM data in much the same manner as other audio data, such as wave data, passing the PCM data into a voice processor (VP) 322. VP 322 is a primary PCM synthesis and sub-mixing engine that comprises a fixed function DSP core in communication with a pipeline of programmable functions. VP 322 performs functions such as sample rate conversion (SRC), pitch shifting, enveloping, filtering, and optionally, three-dimensional (3D) audio localization. Filtering function 332 and SRC function 381a are shown as examples of the functions implemented by VP 322. VP 322 may be programmed to process each stream of voice data individually, or to mix streams of voice data from multiple voice inputs and/or to mix voice data with stored audio data. The processed voice data are stored in one or more logical voice processor mix bins, which are implemented in the physical memory of VP 322.

A global processor (GP) 324 can optionally access the VP memory and further process the voice data. GP 324 is another DSP and can perform audio effects on the voice data, such as applying reverberation or echo effects, distortions, amplitude modulation, gender modification, and other conventional or custom audio effects 380. To perform such effects, GP 324 preferably includes a programmable DSP core and GP memory. However, as is often the case when combining processors, GP 324 runs at a different clock rate than VP 322. In particular, VP 322 operates at about 8 kHz, which is the same rate as incoming PCM voice data. However, GP 324 operates at about 48 kHz. Similarly, decoder 310 may operate at a different clock rate than VP 322. To accommodate the various clock rates, sample rates are converted as necessary before the data are passed to the next processor. For instance, VP 322 converts data at its 8 kHz rate to data at the 48 kHz rate via SRC 381 a. After applying audio effects, GP 324 also preferably converts the data at 48 kHz back to data at 8 kHz via SRC 381b, so that the processed voice data may be used for other purposes that require that rate.

In addition to being unequal, the various clock rates are not simple exact multiples of each other. Further, the various processors are often subject to interrupts and other conditions that prevent each processor from performing its operation at synchronized intervals. As a result, the transfer of data between any two processors tends to be subject to drift as a function of the characteristics of the processors and the communication scheme employed between processors.

As indicated above, GP 324 operates at about 48 kHz to perform effects processing, but uses SRC 381 b to convert the modified voice data to about 8 kHz for use by an encode 312. The voice data converted to about 8 kHz are stored in a circular buffer 207 of RAM 206. Encoder 312 reads the converted voice data from circular buffer 207 as quickly as possible after the converted voice data are written to circular buffer 207. This closely-tied write and subsequent read operation reduces the memory required for circular buffer 207, thereby increasing throughput and reducing the cost of the game console. However, GP 324 and encoder 312 often perform multiple tasks that do not enable the converted voice data to be immediately written and read synchronously. A complex feedback control system could be implemented to synchronize the writing and reading operations. However, such a feedback control system would require components prohibitively expensive for use in a low cost electronic device such as a game console. Instead, a simpler comparative technique is employed, as discussed in greater detail below with regard to FIGS. 5-7.

As suggested above, encoder 312 refers to the converted voice data stored in circular buffer 207. For ease of implementation, encoder 312 was selected from an existing network encoder and an existing USB encoder comprising software executed on the CPU of the game console. However, equivalent encoder software is preferably executed on the DSP of GP 324. In that way, the game console CPU is not required for voice processing. Encoder 312 creates an output packet context 314. Output packet context 314 preferably includes a pointer to a desired address in circular buffer 207 from which to read a specific amount of data stored in circular buffer 207, and header information appropriate for the type of communication used to communicate the voice data to a desired output device or channel. For example, the header information may comprise data needed or USB communication, IEEE 1394 (e.g., FIREWIRE™) communication, IP communication, or other suitable communication format.

Based on the information of output packet context 314, output driver software 316 programs the appropriate output controller hardware 231 to send the voice data stored in circular buffer 207 out to the desired hardware device. Output controller hardware 231 is one of the output units shown in FIG. 2, such as A/V port 228, network interface 232, or USB host controller 230 and routes the voice data to one or more speakers 318, to another device connected to network 320, or to removable function unit 140. Output hardware controller 231 comprises a simple D/A converter to provide analog signals to speakers 318, earphones of headset 142, or other analog output device. However, D/A converters are typically more expensive than low cost digital communication modules, such as the USB (IEEE 1394, IP, or other type of module) indicated above. The game console preferably includes low cost components for this purpose. The optional removable function unit 140 includes a D/A converter 143 to provide the analog voice signals for energizing the earphones of headset 142. Making removable function unit 140 as an optional voice communication module keeps the market price of the game console down. However, the same capability can be included as an integral part of the game console of each input device to facilitate the capture and playback of output from audio processing unit 224 on any peripheral.

Figure 5:
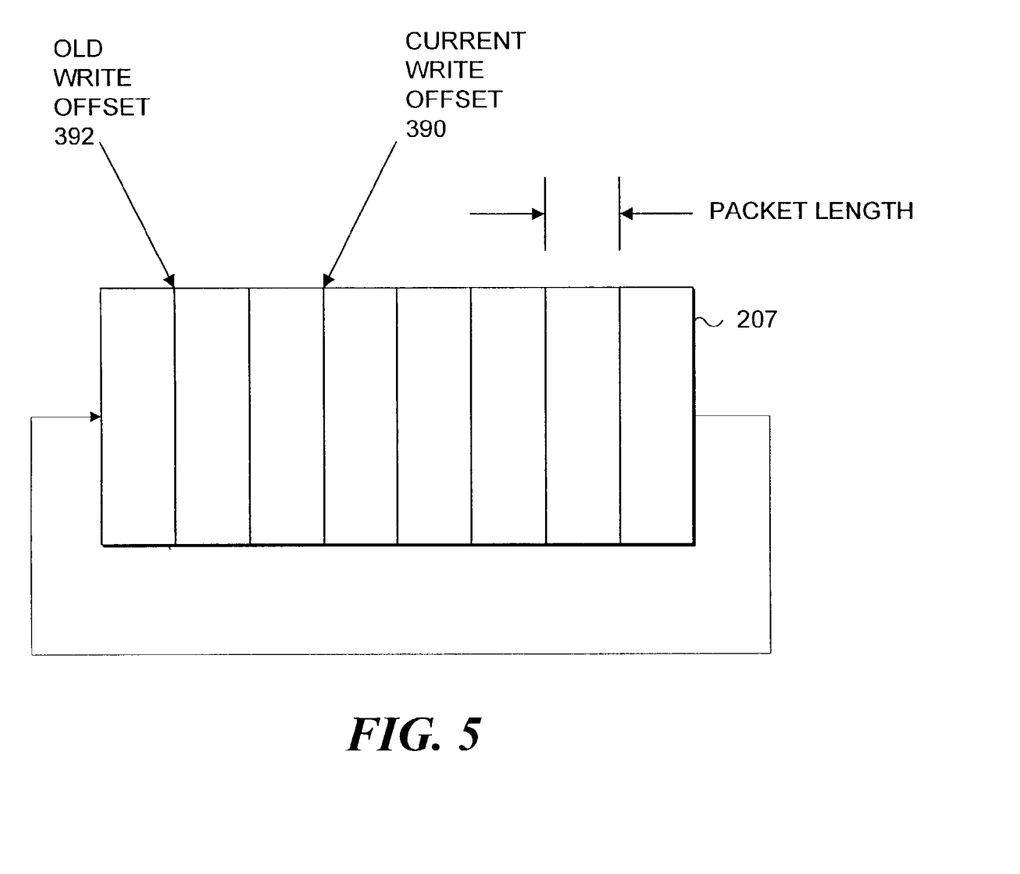
FIG. 5 is a diagram illustrating a circular buffer.

To better disclose the drift compensation process introduced above, FIG. 5 illustrates circular buffer 207 in greater detail. Preferably, circular buffer 207 has a total size that is an integer multiple of a predefined packet length of audio data. For example, the predefined packet length may comprise a sufficient number of bytes (e.g., 32 bytes) or words to store 20 ms of audio data. A packet of audio data is not to be confused with output packet context 314 of FIG. 4. Output packet context 314 simply identifies a pointer or offset to an address within circular buffer 207 and specifies a length of data to be found in circular buffer 207.

In the embodiment of FIG. 4, GP SRC 381b writes voice data to circular buffer 207 at a current write offset 390. GP 324 stores current write offset 390 in a memory internal to GP 324. Encoder 312 reads current write offset 390 directly from the internal memory of GP 324. In this way, encoder 312 can determine the location of the most recently written voice data that are stored just prior to current write offset 390 in circular buffer 207. Encoder 312 preferably reads the most recently written voice data in a conventional ping-pong fashion. Having read the voice data from circular buffer 207, encoder 312 stores an old write offset 392 that corresponds to the last location of circular buffer 207 read by encoder 312. This last location is just before current write offset 390. Old write offset 392 is used for future comparison as described below with regard to FIG. 7.

Figure 6:
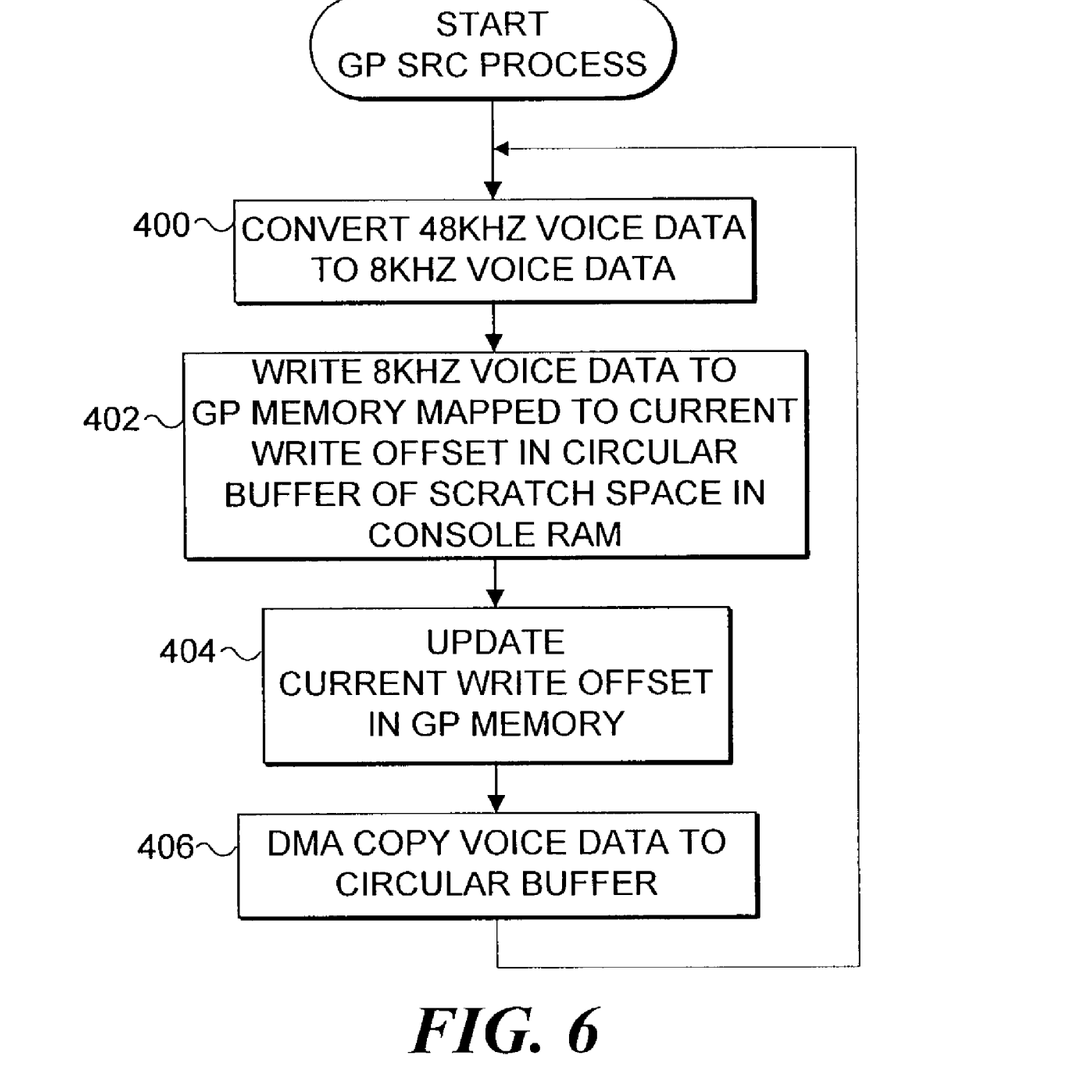
FIG. 6 is a flow diagram illustrating logic used to write voice data to the circular buffer.

To show further detail, FIG. 6 is a flow diagram illustrating logic used by the GP SRC to write voice data to the circular buffer. At a step 400, the GP SRC converts 48 kHz voice data to 8 kHz voice data. At a step 402, the GP SRC writes the 8 kHz voice data to a location in GP memory that corresponds to the current write offset of the circular buffer. The GP SRC then updates a storage location in GP memory that holds the current write offset, at a step 404. The GP SRC replaces the current write offset with a new offset to be used as the current write offset during a next write cycle of the GP SRC to internal GP memory. Updating the current write offset in GP memory can include specifying a write offset that corresponds to a beginning of the circular buffer after having wrapped around from the end of the circular buffer. At a step 406, a DSP execution kernel running on the DSP of the GP initiates a direct memory access (DMA) transfer of the converted voice data to the main RAM of the game console. Control then returns to step 400 to continue converting additional voice data in a stream. Note that this voice stream continues even if only silence is streamed out.

Figure 7:
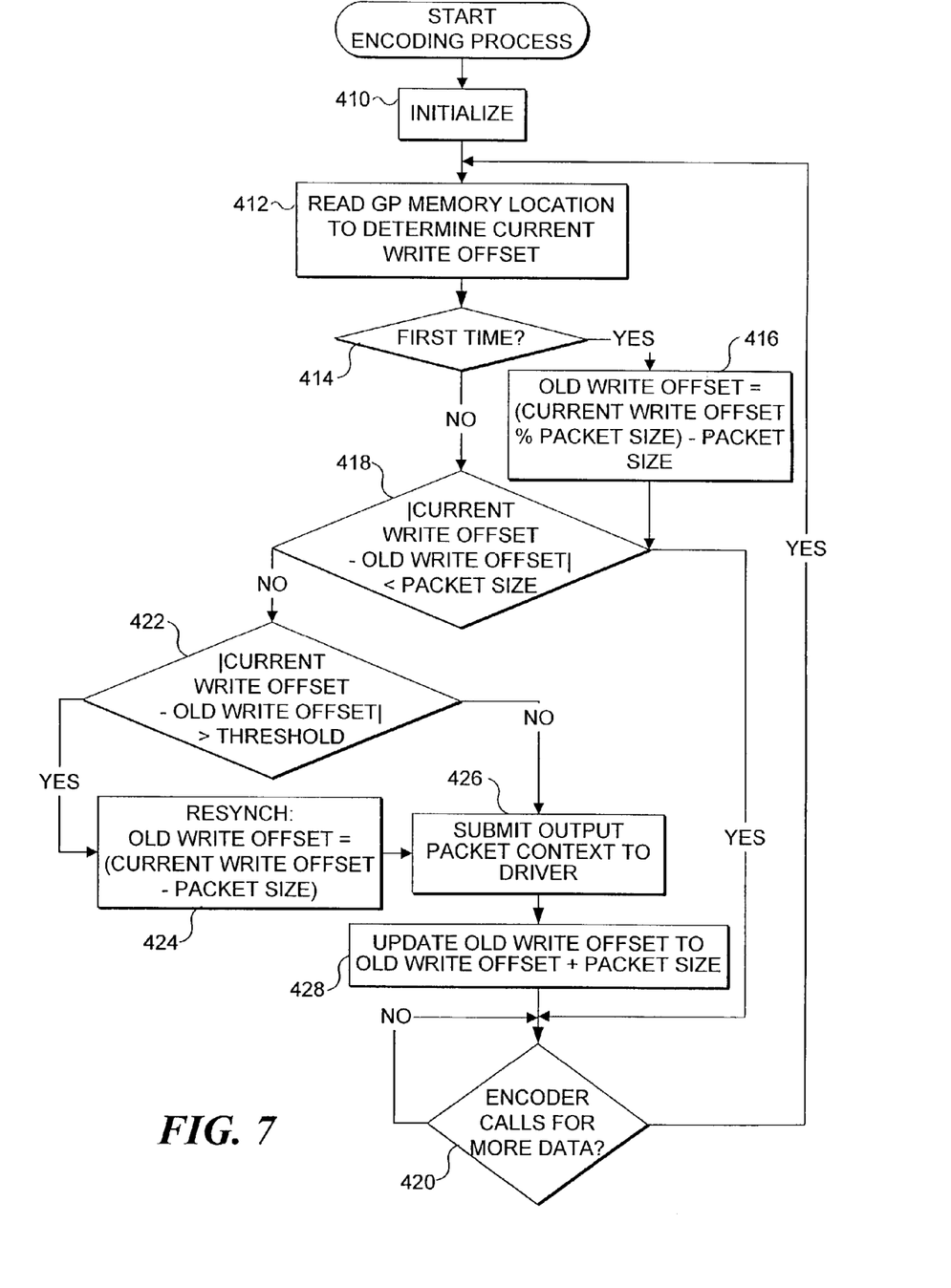
FIG. 7 is a low diagram illustrating logic for an encoder to read and stream voice data from the circular buffer to an appropriate output device.

While the GP is streaming voice data to its internal memory and performing DMA transfers of that voice data to the circular buffer in RAM of the game console, the encoder reads and streams that stored voice data to the appropriate output device. FIG. 7 is a flow diagram illustrating logic for the encoder to read and stream data from the circular buffer to the appropriate output device. At a step 410, the encoder performs initialization tasks, such as setting up the circular buffer in scratch space of game console RAM that has been mapped to the GP memory, and other initialization tasks. Once initialized, the encoder enters a continuous loop, to read and stream the voice data. At a step 412, the encoder directly reads the GP memory location that stores the current write offset (the GP memory location storing the current write offset is not DMA transferred to the game console RAM). At a decision step 414, the encoder determines whether the streaming process is just beginning such that this is the first time that the encoder is to read and stream the voice data since the game console was powered on or reset. If the streaming process is just beginning, the encoder has not yet identified an old write offset relative to the current write offset. Thus, at a step 416, the encoder establishes an initial old write offset as the modulo of the current write offset relative to the packet size of voice data. Specifically, the initial old write offset is set as the current write offset modulo the packet size minus the packet size. Recall that the packet size is preferably approximately 20 ms of voice data.

Once an old write offset is set, the encoder determines at a decision step 418, whether enough data have been accumulated in the circular buffer for the encoder to process. Specifically, the encoder determines whether the absolute value of the current write offset minus the old write offset is less than the packet size. If this comparison is true, then the amount of data available are less than the required for one packet. In that case, there is insufficient data for the encoder to transfer to an output device. Thus, the encoder passes control to a decision step 420 that simply waits until the process of FIG. 7 is called again. For example, the process of FIG. 7 is preferably called once each video frame.

The encoder then checks at a decision step 422 to determine whether too much voice data have accumulated in the circular buffer since the last time voice data were read and transferred to an output device. As indicated above, processors are often not synchronized and/or are subject to interrupts and other delays that can effect continuous streaming of data. For example, the encoder may be directed by a simulation executing on the game console to perform a number of other higher priority functions, in addition to streaming the voice data. Thus, the encoder may fall behind in processing the voice data relative to the GP. At decision step 422, the encoder determines whether it has been delayed by more than a predefined threshold. Specifically, the encoder determines whether the absolute value of the current write offset minus the old write offset is greater than the predefined threshold. The predefined threshold preferably corresponds to a number of packets, such as four packets of voice data. If the difference between the current write offset and the old write offset is greater than the predefined threshold, the encoder resynchronizes the old write offset, at a step 424. Thus, even if the GP and encoder transfer data at the same clock rate, such as 8 kHz, interrupts and other delays may cause the two processors to get out of synchronization.

Rather than implement a costly and complex feedback control system to keep the two processors synchronized, the encoder simply resets the old write offset, so that regular streaming of the voice data can continue without any latency. Specifically, the encoder sets the old write offset to the current write offset minus the packet size. As a consequence, voice data in the circular buffer between the original old write offset and the resynchronized old write offset will be lost. However, the loss of a few packets of voice data, e.g. 20-60 ms is often undetectable and/or insignificant to the human ear. Therefore, low cost components may be used in the audio system with only negligible losses in audio quality.

When the encoder is sufficiently synchronized, the encoder prepares and submits an output packet context to the output driver software, at a step 426. The output packet context identifies the old write offset and an amount of voice data to read (e.g., up to the current write offset), so that the output control hardware can react the appropriate amount of voice data from the circular buffer. After the output packet context is submitted, the encoder updates the value of the old write offset by setting the old write offset equal to the old write offset plus a packet size, at step 428. Those skilled in the art will recognize that the old write offset may be updated to a greater or lesser extent, as appropriate for any pair of processors and number of packets read by the encoder. Once the old write offset is updated, control passes to decision step 420 at which the encoder waits for another call to loop back through the above process.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for integrating voice communication into a game console that includes a primary processor, so as to limit use of the primary processor for processing voice data, comprising the steps of:
   (a) supplying voice data at a first data rate, as an input to the game console;
   (b) processing the voice data that were supplied at the first data rate, with a secondary processor of the game console, the secondary processor processing the voice data at a second data rate, to produce processed voice data, said processed voice data including any desired effects to be applied to the voice data by the game console, wherein the second data rate is substantially different than the first data rate;
   (c) converting the processed voice data to the first data rate with the secondary processor, producing converted voice data;
   (d) storing the converted voice data in a memory configured to be accessible as a circular buffer; and
   (e) using the primary processor to access the converted voice data stored in the circular buffer when producing a stream of packets of the converted voice data for output from the game console.

2. The method of claim 1, further comprising the steps of:
   (a) determining whether an amount of the converted voice data stored in the memory between a read location and a write location is greater than a predefined limit, wherein the predefined limit corresponds to a human perceptible latency in the stream of packets of the converted voice data output from the game console; and
   (b) if the amount of the converted voice data stored in the memory between the read location and the write location exceeds the predefined limit, advancing the read location in the memory so that a portion of the converted voice data stored in the memory is not used in producing the stream of packets of the voice data output from the game console, thereby avoiding creating the human perceptible latency in the stream of packets of the voice data output from the game console.

3. The method of claim 1, wherein the secondary processor and the primary processor operate at different clock rates.

4. The method of claim 1, wherein the step of processing the voice data, comprises at least one of the steps of:
   (a) applying programmable functions to the voice data, said programmable functions including at least one of a mixing of incoming streams of the voice data, a sample rate conversion, a pitch shifting, an envelope function, a filtering function, and a three-dimensional audio localization function; and
   (b) applying audio effects to the voice data, said audio effects including at least one of a mixing of the incoming streams of the voice data, a reverberation, a distortion, an echo, an amplitude modulation, an infinite impulse response effect, and a chorus effect.

5. The method of claim 1, wherein the voice data input to the game console comprise pulse code modulation (PCM) data.

6. The method of claim 1, wherein the stream of packets of the converted voice data are encoded into digital data compatible with a selected communication format before being output from the game console.

7. The method of claim 2, wherein the step of storing the converted voice data in the memory includes the step of updating a current write offset that indicates a location in the circular buffer at which the converted voice data will next be stored by the secondary processor.

8. The method of claim 7, wherein the step of determining whether the amount of the converted voice data stored in the memory exceeds the predefined limit is implemented by the primary processor and comprises the steps of:
   (a) determining an old write offset that corresponds to a location in the circular buffer at which a first portion of the converted voice data was previously stored;
   (b) determining the current write offset; and
   (c) determining whether the current write offset differs from the old write offset by more than a predefined amount.

9. The method of claim 8, further comprising the step of resetting the old write offset to correspond to a location in the circular buffer that is within the predefined amount.

10. The method of claim 1, further comprising the step of converting the stream of packets of the converted voice data into an analog signal for driving a sound transducer.

11. The method of claim 1, wherein at least one of the input voice data and the stream of packets of the converted voice data are conveyed over a network.

12. A computer-readable medium having machine instructions stored thereon for carrying out the steps of claim 1.

13. A game console integrating voice communication with other audio processing, comprising:
   (a) a primary processor;
   (b) a secondary processor that is substantially independent of the primary processor of the game console, said secondary processor being programmed with machine instructions stored in a secondary processor memory for carrying out a plurality of functions for processing audio data, including voice communication data;
   (c) a sound transducer that is coupled in communication with the primary processor; and
   (d) a memory in communication with the secondary processor and the primary processor and shared by both, said memory having a portion allocated to a circular buffer and storing machine instructions that cause the primary processor to carry out a plurality of functions in regard to the voice data that are distinct from the plurality of functions carried out in regard to the voice data by the secondary processor, wherein the plurality of functions carried out by the primary processor and the secondary processor include:
      (i) receiving voice data at a first data rate, as an input to the game console;
      (ii) processing the voice data that were supplied at the first data rate, with the secondary processor of the game console, the secondary processor processing the voice data at a second data rate, to produce processed voice data, said processed voice data including any desired effects to be applied to the voice data by the game console, wherein the second data rate is substantially different than the first data rate;
      (iii) converting the processed voice data to the first data rate with the secondary processor, producing converted voice data;
      (iv) storing the converted voice data in the circular buffer; and
      (v) using the primary processor to access the converted voice data stored in the circular buffer when producing a stream of packets of the converted voice data for output from the game console.

14. The game console of claim 13, wherein the plurality of functions carried out by the primary processor and the secondary processor further include:
   (a) determining whether an amount of the converted voice data stored in the memory is greater than a predefined limit, wherein the predefined limit corresponds to a human perceptible latency in the stream of packets of the converted voice data output from the game console; and
   (b) if the amount of the converted voice data stored in the memory exceeds the predefined limit, advancing a read location in the memory so that a portion of the converted voice data stored in the memory is not used in producing the stream of packets of the voice data output from the game console, thereby avoiding creating the human perceptible latency in the stream of packets of the voice data output from the game console.

15. The game console of claim 14, wherein the plurality of functions carried out by the primary processor and the secondary processor further include updating a current write offset that indicates a location in the circular buffer at which the converted voice data will next be stored by the secondary processor.

16. The game console of claim 15, wherein the plurality of functions carried out by the primary processor and the secondary processor further include:
   (a) determining an old write offset that corresponds to a location in the circular buffer at which a first portion of the converted voice data was previously stored;
   (b) determining the current write offset; and (c) determining whether the current write offset differs from the old write offset by more than a predefined amount.

17. The game console of claim 16, wherein the plurality of functions carried out by the primary processor and the secondary processor further include resetting the old write offset to correspond to a location in the circular buffer that is within the predefined amount.

18. The game console of claim 16, further comprising a sound transducer driven by an analog signal generated from the stream of packets of the converted voice data.

19. A method for integrating voice communication into a game console that includes a primary processor, so as to limit use of the primary processor for processing voice data, comprising the steps of:
   (a) supplying voice data at a first data rate, as an input to the game console;

(b) processing the voice data that were supplied at the first data rate, with a secondary processor of the game console, the secondary processor processing the voice data at a second data rate, to produce processed voice data, said processed voice data including any desired effects to be applied to the voice data by the game console, wherein the second data rate is substantially different than the first data rate;

(c) converting the processed voice data to the first data rate with the secondary processor, producing converted voice data that are stored in a memory configured to be accessible as a circular buffer;

(d) producing a packet context that identifies a memory location and length of the converted voice data to be output from the game console; and (e) instructing an output controller to output the converted voice data according to the packet context.

20. The method of claim 19, wherein the step of producing the stream of packet contexts comprises the steps of:

(a) determining an old write offset that corresponds to a location in the memory at which a first portion of the processed voice data was previously stored;

(b) determining a current write offset at which the processed voice data will next be stored in the memory;

(c) determining whether the current write offset differs from the old write offset by more than a predefined amount;

(d) resetting the old write offset to correspond to a location in the memory that is within the predefined amount, producing a reset old write offset; and (e) specifying the reset old write offset as the memory location identified in the packet context.

* * * * *